US012603717B2

(12) United States Patent
Cho et al.

(10) Patent No.: US 12,603,717 B2
(45) Date of Patent: Apr. 14, 2026

(54) ELECTRONIC DEVICE FOR ESTABLISHING COMMUNICATION CONNECTION TO EXTERNAL ELECTRONIC DEVICE AND OPERATION METHOD THEREOF

(71) Applicant: SAMSUNG ELECTRONICS CO., LTD., Suwon-si (KR)

(72) Inventors: Junwan Cho, Suwon-si (KR); Doosuk Kang, Suwon-si (KR); Sangchul Yun, Suwon-si (KR); Gyujin Lee, Suwon-si (KR); Jubyung Lee, Suwon-si (KR); Wonkyoung Jang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 340 days.

(21) Appl. No.: 18/224,854

(22) Filed: Jul. 21, 2023

(65) Prior Publication Data

US 2023/0361899 A1 Nov. 9, 2023

Related U.S. Application Data

(63) Continuation of application No. PCT/KR2022/000207, filed on Jan. 6, 2022.

(30) Foreign Application Priority Data

Jan. 22, 2021 (KR) ........................ 10-2021-0009536

(51) Int. Cl.

*H04H 60/37* (2008.01)
*H04H 60/32* (2008.01)
*H04H 60/70* (2008.01)

(52) U.S. Cl.

CPC .......... *H04H 60/375* (2013.01); *H04H 60/32* (2013.01); *H04H 60/70* (2013.01); *H04H 2201/13* (2013.01)

(58) Field of Classification Search

CPC ........................................................ H04W 4/80

See application file for complete search history.

(56) References Cited

U.S. PATENT DOCUMENTS 9,451,645 B2 9/2016 Choi et al.
9,654,916 B2 5/2017 De La Broise
(Continued)

FOREIGN PATENT DOCUMENTS

EP 2555546 B1 5/2015
EP 3310122 A1 4/2018
(Continued)

OTHER PUBLICATIONS

International Search Report and Written Opinion for International Application No. PCT/KR2022/000207; International Filing Date Jan. 6, 2022; Date of Mailing Apr. 18, 2022; 52 Pages.
(Continued)

*Primary Examiner* — Wen W Huang
(74) *Attorney, Agent, or Firm* — CANTOR COLBURN LLP

(57) ABSTRACT

Disclosed is an electronic device including a communication module, a processor and a memory that stores instructions. The instructions, when executed, cause the processor to receive a first signal from a first external electronic device through the communication module while a communication connection to at least one second external electronic device is being established, select a specified number of third external electronic devices or less from among the first external electronic device and the at least one second external electronic device based on the first signal, and transmit data to or receive data from the selected third external electronic devices through established communication connections to the selected third external electronic devices. The third external electronic devices are selected in order of having a weak signal intensity or a greater distance
(Continued)

from the electronic device from among the first external electronic device and the at least one second external electronic device.

16 Claims, 7 Drawing Sheets

(56) References Cited

U.S. PATENT DOCUMENTS

| | | | |
|---|---|---|---|
| 9,699,612 | B2 | 7/2017 | Evans et al. |
| 9,741,008 | B2 | 8/2017 | Loutit |
| 9,749,791 | B2 | 8/2017 | De La Broise |
| 9,779,596 | B2 | 10/2017 | Ingrassia, Jr. et al. |
| 9,965,942 | B2 | 5/2018 | De Barros Chapiewski et al. |
| 9,972,191 | B2 | 5/2018 | De Barros Chapiewski et al. |
| 9,973,890 | B2 | 5/2018 | De La Broise |
| 9,973,898 | B2 | 5/2018 | Farley et al. |
| 9,998,864 | B2 | 6/2018 | Kumar et al. |
| 10,264,421 | B2 | 4/2019 | Farley et al. |
| 10,271,171 | B2 | 4/2019 | Evans et al. |
| 10,346,787 | B2 | 7/2019 | Loutit |
| 10,410,485 | B2 | 9/2019 | Ingrassia, Jr. et al. |
| 10,469,991 | B2 | 11/2019 | Evans et al. |
| 10,638,262 | B2 | 4/2020 | Farley et al. |
| 10,743,359 | B2 | 8/2020 | Bae et al. |
| 10,952,267 | B2 | 3/2021 | Song et al. |
| 11,197,347 | B2 | 12/2021 | Park et al. |
| 11,282,351 | B2 | 3/2022 | Ingrassia, Jr. et al. |
| 2013/0252656 | A1 | 9/2013 | Lee et al. |
| 2014/0213256 | A1 | 7/2014 | Meylan et al. |
| 2016/0150356 | A1 * | 5/2016 | Matsushita ........... H04W 48/16 455/41.1 |
| 2016/0278137 | A1 | 9/2016 | Oguchi |
| 2016/0374129 | A1 | 12/2016 | Saiwai et al. |
| 2017/0279988 | A1 * | 9/2017 | Tsuchiya ............ H04N 1/00307 |
| 2019/0166477 | A1 * | 5/2019 | Seo ........................ H04W 76/14 |
| 2019/0266549 | A1 | 8/2019 | Loutit |
| 2020/0008048 | A1 | 1/2020 | Takahashi |
| 2020/0413462 | A1 | 12/2020 | Cheong et al. |
| 2021/0092797 | A1 * | 3/2021 | Miyamoto ............ H04W 8/005 |
| 2022/0095419 | A1 | 3/2022 | Park et al. |

FOREIGN PATENT DOCUMENTS

| | | | |
|---|---|---|---|
| KR | 20130107617 | A | 10/2013 |
| KR | 20150113018 | A | 10/2015 |
| KR | 20190095784 | A | 8/2019 |
| KR | 20200017302 | A | 2/2020 |
| KR | 102087010 | B1 | 3/2020 |
| KR | 20200049257 | A | 5/2020 |

OTHER PUBLICATIONS

Supplementary European Search Report for International Application No. PCT/KR2022000207; International Filing Date Jan. 6, 2022; Dated of Mailing Apr. 1, 2024; 10 Pages.

* cited by examiner

ELECTRONIC DEVICE FOR ESTABLISHING COMMUNICATION CONNECTION TO EXTERNAL ELECTRONIC DEVICE AND OPERATION METHOD THEREOF

CROSS-REFERENCE TO RELATED APPLICATIONS

This application is a continuation application, claiming priority under § 365(c), of International Application No. PCT/KR2022/000207, filed on Jan. 6, 2022, which is based on and claims the benefit of Korean patent application number 10-2021-0009536 filed on Jan. 22, 2021, in the Korean Intellectual Property Office, the disclosures of which are incorporated by reference herein in their entireties.

TECHNICAL FIELD

Various embodiments disclosed herein relate to an electronic device establishing a communication connection with an external electronic device and an operation method thereof.

BACKGROUND ART

An electronic device may exchange information with an external electronic device through a communication connection. When the established communication connection with the electronic device is disconnected, the external electronic device may broadcast an advertisement signal including its own identification information to nearby electronic devices. A nearby electronic device receiving the advertisement signal of the external electronic device may transmit location information along with identification information of the external electronic device to a server according to the state of the external electronic device. A user may identify the lost location of the external electronic device by receiving the location information along with the identification information of the external electronic device from the server through the electronic device.

DISCLOSURE

Technical Problem

When a communication connection between an electronic device and an external electronic device is established, resources of the electronic device may decrease. For example, an antenna of the electronic device may be occupied for data transmission/reception with the external electronic device according to the communication connection with the external electronic device. The electronic device may have restrictions in communication with other electronic devices as much as time and frequency resources consumed for data transmission and reception with the external electronic device. Also, the battery of the electronic device may be consumed according to the communication connection with the external electronic device.

Therefore, it is necessary to achieve a balance between the communication connection with the external electronic device and resources of the electronic device.

According to various embodiments of the present disclosure, the electronic device may manage communication resources with the external electronic device based on information on the communication connection state with the external electronic device.

Technical Solution

According to an embodiment disclosed herein, an electronic device includes a communication module, a processor operatively connected to the communication module, and a memory operatively connected to the processor to store instructions, wherein the instructions, when executed, cause the processor to receive a first signal from a first external electronic device through the communication module while a communication connection with at least one second external electronic device is established, select a specified number or less of third external electronic devices among the first external electronic device and the at least one second external electronic device based on the first signal, and transmit and receive data with the selected third external electronic devices through established communication connections with the selected third external electronic devices. The third external electronic devices are selected from among the first external electronic device and the at least one second external electronic device in order of weaker signal strength or greater distance from the electronic device.

According to an embodiment disclosed herein, a method for operating an electronic device includes receiving a first signal from a first external electronic device through a communication module of the electronic device while a communication connection with at least one second external electronic device is established, selecting a specified number or less of third external electronic devices among the first external electronic device and the at least one second external electronic device based on the first signal, and transmitting and receiving data with the selected third external electronic devices through established communication connections with the selected third external electronic devices. The third external electronic devices are selected from among the first external electronic device and the at least one second external electronic device in order of weaker signal strength or greater distance from the electronic device.

It is to be understood that technical objects to be achieved by the present disclosure are not limited to the aforementioned technical object and other technical objects which are not mentioned herein will be apparent from the following description to one of ordinary skill in the art to which the present disclosure pertains.

Advantageous Effects

According to various embodiments disclosed herein, it is possible to achieve a balance between a communication connection with an external electronic device and resources of an electronic device.

Effects obtainable from various embodiments of the present disclosure are not limited to the effects mentioned above, and other effects not mentioned will become clear to those skilled in the art from the description below. You will be able to understand.

DESCRIPTION OF DRAWINGS

In the description of the drawings, the same or similar reference numerals may be used for the same or similar components.

MODE FOR INVENTION

Figure 1:
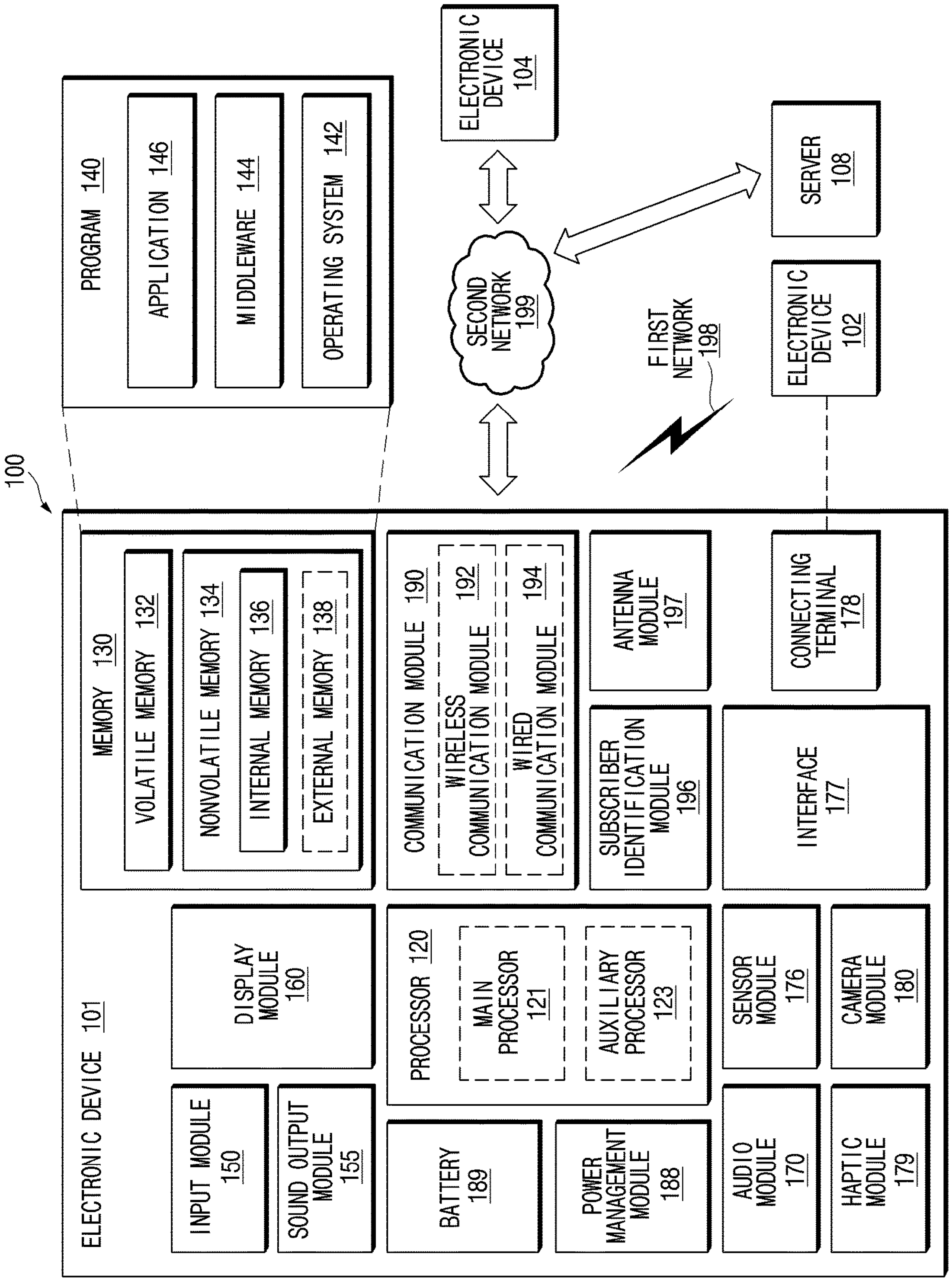
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
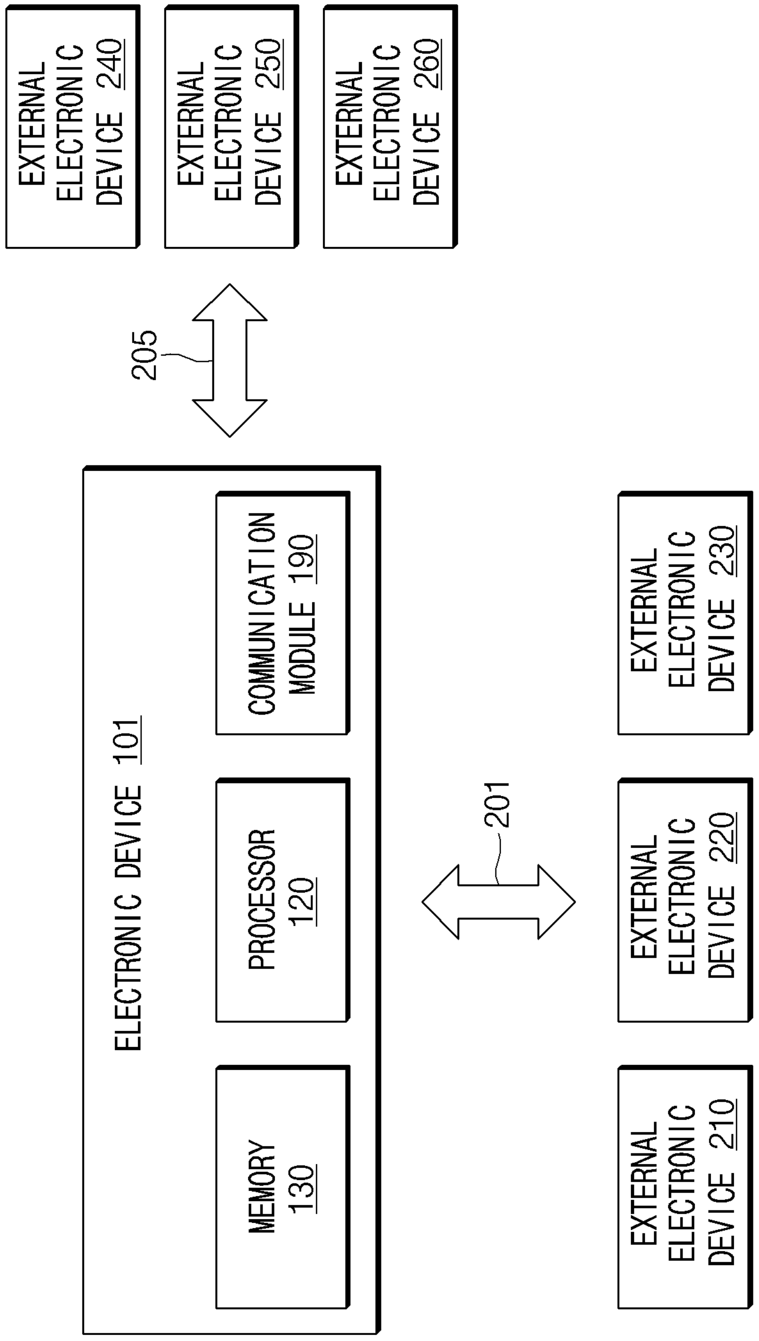
FIG. 2 is a diagram illustrating electronic devices according to an embodiment.

FIG. 2 is a diagram illustrating electronic devices 101, 210, 220, 230, 240, 250, and 260 according to an embodiment.

In an embodiment, the electronic device 101 may correspond to the electronic device 101 of FIG. 1.

In an embodiment, the external electronic devices 210, 220, and 230 may be devices capable of transmitting and receiving data to and from the electronic device 101 through a network 201 according to a first radio access technology (RAT). In an embodiment, network 201 may correspond to the first network 198 of FIG. 1. In an embodiment, the first radio access technology may be a low power radio access technology (e.g., Bluetooth™ low energy (BLE)).

In an embodiment, each of the external electronic devices 210, 220, and 230 may be a device capable of broadcasting their identification information to a nearby electronic device (e.g., the electronic device 102) when a specified event (e.g., communication disconnection) occurs. In an embodiment, the nearby electronic device may be a device capable of transmitting information (e.g., identification information of the external electronic devices 210, 220, and 230 and location information of the nearby electronic device) to the server 108. In an embodiment, the server 108 may transmit lost information about the external electronic devices 210, 220, and 230 (e.g., identification information of the external electronic devices 210, 220, and 230 and location information of the nearby electronic device) to the electronic device 101 based on receiving the information.

In an embodiment, each of the external electronic devices 240, 250, and 260 may be a device capable of transmitting and receiving data to and from the electronic device 101 through a network 205 according to the first radio access technology and/or a second radio access technology. In an embodiment, network 205 may correspond to the first network 198 of FIG. 1. In an embodiment, the second radio access technology may be a wireless access technology (e.g., Bluetooth™, Wi-Fi, Wi-Fi direct) using a frequency band that at least partially overlaps the frequency band of the first radio access technology.

In an embodiment, the electronic device 101 may include the processor 120, the memory 130, the communication module 190, or a combination thereof. In an embodiment, the processor 120, the memory 130, or the communication module 190 may correspond to the processor 120, the memory 130, or the communication module 190 of FIG. 1.

In an embodiment, the processor 120 may identify the number of electronic devices capable of communication connection (hereinafter referred to as 'number of available connections'). In an embodiment, the processor 120 may identify the minimum number of electronic devices capable of communication connection (hereinafter referred to as 'minimum number of available connections'). In an embodiment, the processor 120 may identify the maximum number of electronic devices capable of communication connection (hereinafter referred to as 'maximum number of available connections'). In an embodiment, the number of available connections may be the number of electronic devices capable of communication connection through a first RAT (e.g., BLE). In an embodiment, the number of available connections may be determined as a number greater than or equal to the minimum number of available connections and less than or equal to the maximum number of available connections. In an embodiment, an initial setting value for the number of available connections may correspond to the maximum number of available connections. In an embodiment, the number of available connections, the minimum number of available connections, and the maximum number of available connections may be a number set for a specific type of electronic device (e.g., a device for identification as to whether the device is lost or not) among electronic devices capable of communication connection through the first RAT (e.g., BLE).

In an embodiment, the processor 120 may identify the number of available connections based on available resources. In an embodiment, the resources may include communications, batteries, or combinations thereof.

In an embodiment, the processor 120 may identify the number of available connections based on available communication resources.

In one embodiment, the processor 120 may identify the number of available connections based on the number of communication connections using a specified frequency band. In an embodiment, the specified frequency band may be a frequency band including a frequency band (e.g., 2.4 GHz) used by the first RAT (e.g., BLE).

In an embodiment, the processor 120 may decrease the number of available connections by a specified value when there is an increase in the number of communication connections using a specified frequency band.

In an embodiment, the processor 120 may decrease the number of available connections by the specified value when there is an increase in the number of communication connections according to a RAT (e.g., Bluetooth™, Wi-Fi, Wi-Fi direct) using a specified frequency band. In an embodiment, the processor 120 may decrease the number of available connections by a specified first value when there is an increase in the number of Bluetooth™ based communication connections using a specified frequency band. In an embodiment, the processor 120 may decrease the number of available connections by a specified second value when there is an increase in the number of Wi-Fi based communication connections using a specified frequency band. In an embodiment, the second value may be greater than the first value. In an embodiment, the second value may be less than or equal to the first value. In one embodiment, the first value and the second value may be determined corresponding to a frequency bandwidth occupied for each specified communication connection. For example, the first value may be determined based on a Bluetooth™ based channel bandwidth (e.g., 1 MHz). For example, the second value may be determined based on a ratio of a Wi-Fi based channel bandwidth (e.g., 20 or 40 MHz).

In an embodiment, the processor 120 may increase the number of available connections by a specified value when there is an increase in the number of communication connections using a specified frequency band.

In an embodiment, the processor 120 may identify the number of available connections based on the type of electronic device communicatively connected to the electronic device 101 using a specified frequency band. In an embodiment, the processor 120 may identify the number of available connections based on the type of electronic device communicatively connected using a second RAT (e.g., Bluetooth™ Wi-Fi, or Wi-Fi direct).

In an embodiment, when an electronic device communicatively connected to the electronic device 101 using a specified frequency band is a device that requires low latency (e.g., an input device (e.g., a wireless keyboard, a wireless mouse), an output device (e.g., wireless earphones, AR (augmented reality) glasses), the processor 120 may decrease the number of available connections by a specified value. In an embodiment, when an electronic device of which the communication connection with the electronic device 101 using a specified frequency band has been disconnected is a device requiring low latency, the processor 120 may increase the number of available connections by a specified value.

In an embodiment, the processor 120 may identify the number of available connections based on the quality of a communication connection using a specified frequency band. In an embodiment, the processor 120 may identify the number of available connections based on the quality of communication connections according to the second RAT (e.g., Bluetooth™, Wi-Fi, or Wi-Fi direct). In an embodiment, the processor 120 may adjust the number of available connections based on the number of retransmissions of data according to the communication connection using the specified frequency band (e.g., the number of retransmissions according to an automatic repeat request (ARQ) technique), transmission failure (e.g., transmission failure due to timeout) and/or a packet error rate (PER).

In an embodiment, when the number of retransmissions for data in a first communication connection exceeds a first number of retransmissions, the processor 120 may determine that the quality of the first communication connection is poor or of low quality. In an embodiment, when the number of retransmissions for data in a first communication connection during a specified reference time exceeds a first number of retransmissions, the processor 120 may determine that the quality of the first communication connection is poor or of low quality. In an embodiment, when the number of retransmissions for data in the first communication connection is less than a second number of retransmissions, the processor 120 may determine that the quality of the first communication connection is good or of high quality. In an embodiment, the processor 120 may determine that the quality of the first communication connection is good or of high quality when the number of retransmissions for the data in the first communication connection during the specified reference time is less than the second number of retransmissions. In an embodiment, the first communication connection may be a communication connection according to a second RAT (e.g., Bluetooth™, Wi-Fi, and/or Wi-Fi direct) that is distinguished from the first RAT (e.g., BLE). In an embodiment, the first number of retransmissions and the second number of retransmissions may be different from each other.

In an embodiment, the processor 120 may determine that the quality of the first communication connection is poor or of low quality when the number of data transmission failures in the first communication connection exceeds a first number of transmission failures. In an embodiment, when the number of transmission failures for data in a first communication connection during a specified reference time exceeds the first number of transmission failures, the processor 120 may determine that the quality of the first communication connection is poor or of low quality. In an embodiment, the processor 120 may determine that the quality of the first communication connection is good or of high quality when the number of transmission failures for data in the first communication connection is less than the second number of transmission failures. In an embodiment, the processor 120 may determine that the quality of the first communication connection is good or of high quality when the number of transmission failures in the first communication connection during the specified reference time is less than the second number of transmission failures. In an embodiment, the first number of transmission failures and the second number of transmission failures may be different from each other.

In an embodiment, the processor 120 may determine that the quality of the first communication connection is poor or of low quality when the packet error rate in the first communication connection exceeds a first threshold. In an embodiment, the processor 120 may determine that the quality of the first communication connection is poor or of low quality when the packet error rate during a specified reference time exceeds the first threshold in the first communication connection. In an embodiment, the processor 120 may determine that the quality of the first communication connection is good or of high quality when the packet error rate is less than a second threshold in the first communication connection. In an embodiment, the processor 120 may determine that the quality of the first communication connection is good or of high quality when the packet error rate during the specified reference time is less than the second threshold in the first communication connection. In an embodiment, the first threshold and the second threshold may be different from each other.

In an embodiment, when the quality of the first communication connection is determined to be poor or of low quality, the processor 120 may decrease the number of available connections. In an embodiment, when the quality of the first communication connection is determined to be good or of high quality, the processor 120 may increase the number of available connections.

In an embodiment, the processor 120 may identify the number of available connections based on the state (e.g., remaining capacity, or charging status) of the battery 189 of the electronic device 101. In an embodiment, the processor 120 may decrease the number of available connections when the remaining capacity of the battery 189 is equal to or less than a first capacity. In an embodiment, the processor 120 may increase the number of available connections when the battery 189 is being charged.

In an embodiment, the processor 120 may identify the number of available connections based on situation information. In an embodiment, the situation information may include time and/or location information.

In an embodiment, when the location of the electronic device 101 is a location where at least one of the external electronic devices 210, 220, and 230 is lost (hereinafter referred to as 'lost location'), the processor 120 may increase the number of available connections. In an embodiment, the lost location may be a location where at least one electronic device broadcasts its identification information to nearby electronic devices (e.g., the electronic device 102) based on a specified event (e.g., disconnection of a communication connection). In an embodiment, the lost location may correspond to location information of a nearby electronic device acquired based on the nearby electronic device receiving the identification information of at least one of the external electronic devices 210, 220, and 230. In an embodiment, the lost location may correspond to a location selected based on the location information obtained from at least one nearby electronic device by the server 108.

In an embodiment, the processor 120 may increase the number of available connections when the current time is a time at which at least one of the external electronic devices 210, 220, and 230 is lost (hereinafter referred to as 'lost time'). In an embodiment, the lost time may be a time when at least one electronic device broadcasts its identification information to a nearby electronic device (e.g., the electronic device 102) based on a specified event (e.g., disconnection of a communication connection). In an embodiment, the lost location may correspond to a time selected based on time information at which the server 108 has received location information from at least one nearby electronic device.

In an embodiment, the processor 120 may receive a signal of a specified type (e.g., advertisement). In an embodiment, the processor 120 may receive a specified packet (e.g., advertisement packet). In an embodiment, the processor 120 may receive a specified packet (e.g., advertisement packet) according to the first RAT (e.g., BLE). In an embodiment, the processor 120 may receive an advertisement packet from an external electronic device (e.g., the external electronic device 230). Hereinafter, an external electronic device that has transmitted an advertisement packet may be referred to as a connection requesting device.

In an embodiment, the processor 120 may determine whether or not to establish a communication connection for a connection requesting device (e.g., external electronic device 230) based on the number of external electronic devices (e.g., the external electronic devices 210 and 220) that are currently communicatively connected. In an embodiment, the processor 120 may determine whether or not to establish a communication connection for a connection requesting device (e.g., the external electronic device 230) based on the minimum number of available connections. In an embodiment, the processor 120 may determine whether or not to establish a communication connection for a connection requesting device (e.g., the external electronic device 230) based on the number of available connections. Hereinafter, the currently communicatively connected electronic device may be referred to as a previously-connected device.

In an embodiment, the processor 120 may decide to establish a communication connection with the connection requesting electronic device (e.g., the external electronic device 230) when the number of previously-connected devices (e.g., the external electronic device 210 and the external electronic device 220) is less than the minimum number of available connections. In an embodiment, the processor 120 may decide to establish a communication connection with the connection requesting device (e.g., the external electronic device 230) when the number of previously-connected devices (e.g., the external electronic device 210 and the external electronic device 220) is less than the number of available connections.

In an embodiment, the processor 120 may identify whether a communication connection with the connection requesting device (e.g., the external electronic device 230) is required when the number of previously-connected devices (e.g., the external electronic device 210 and the external electronic device 220) is equal to (or greater than) the number of available connections. In an embodiment, the processor 120 may identify whether disconnection of the communication connections with the previously-connected devices (e.g., the external electronic device 210 and the external electronic device 220) is required when the number of previously-connected devices (e.g., the external electronic device 210 and the external electronic device 220) is equal to (or greater than) the number of available connections.

In an embodiment, the processor 120 may identify whether a communication connection with the connection requesting device (e.g., the external electronic device 230) is required based on the signal strength (e.g., RSSI (received signal strength indicator)) of a packet transmitted by the connection requesting device (e.g., the external electronic device 230). In an embodiment, the processor 120 may identify whether a communication connection with a connection requesting device (e.g., the external electronic device 230) is required based on the signal strength of a connection requesting device (e.g., the external electronic device 230) and the signal strengths of previously-connected devices (e.g., the external electronic device 210 and the external electronic device 220). In an embodiment, the signal strength of the previously-connected device may be identified based on a packet previously transmitted by the previously-connected device. In an embodiment, the signal strength of the previously-connected device may be identified based on a packet periodically transmitted by the previously-connected device. In an embodiment, the signal strength of the previously-connected device may be identified based on a packet most recently transmitted by the previously-connected device.

In an embodiment, the processor 120 may identify that a communication connection with a connection requesting device (e.g., the external electronic device 230) is required when the signal strength of the connection requesting device is weaker (or lower) than the largest signal strength among signal strengths of the previously-connected devices. In an embodiment, the processor 120 may identify that a communication connection with a connection requesting device (e.g., the external electronic device 230) is not required when the signal strength of the connection requesting device is stronger (or higher) than the largest signal strength among signal strengths of the previously-connected devices.

In an embodiment, the processor 120 may identify whether a communication connection with the connection requesting device (e.g., the external electronic device 230) is required based on the degree of signal attenuation of a packet transmitted by the connection requesting device (e.g., the external electronic device 230). In an embodiment, the processor 120 may identify whether a communication connection with a connection requesting device (e.g., the external electronic device 230) is required based on a degree of signal attenuation of a connection requesting device (e.g., the external electronic device 230) and the degrees of signal attenuation of previously-connected devices (e.g., the external electronic device 210 and the external electronic device 220). In an embodiment, the degree of signal attenuation of the previously-connected device may be identified based on a packet previously transmitted by the previously-connected device. In an embodiment, the degree of signal attenuation of the previously-connected device may be identified based on a packet periodically transmitted by the previously-connected device. In an embodiment, the degree of signal attenuation of the previously-connected device may be identified based on a packet most recently transmitted by the previously-connected device. In one embodiment, the degree of signal attenuation may correspond to a ratio between a transmitted signal strength and a received signal strength.

In an embodiment, when the degree of signal attenuation of the connection requesting device is greater than the smallest degree of signal attenuation among the degrees of signal attenuation of the previously-connected devices, the processor 120 may identify that the communication connection with the connection requesting device (e.g., the external electronic device 230) is required. In an embodiment, when the degree of signal attenuation of the connection requesting device is less than the smallest degree of signal attenuation among the degrees of signal attenuation of the previously-connected devices, the processor 120 may identify that the communication connection with the connection requesting device (e.g., the external electronic device 230) is not required.

In an embodiment, the processor 120 may identify whether a communication connection is required based on a distance to the electronic device (e.g., the external electronic device 230) that has transmitted an advertisement packet. In an embodiment, the processor 120 may identify whether a communication connection with a connection requesting device (e.g., the external electronic device 230) is required based on a distance to a connection requesting device (e.g., the external electronic device 230) and distances to previously-connected devices (e.g., the external electronic device 210 and the external electronic device 220). In an embodiment, the distance may be identified based on a positioning technique. In an embodiment, the positioning technique may include an ultra wideband (UWB) based positioning technique. In an embodiment, the UWB based positioning technique may include a time difference of arrival (TDoA) technique and/or a two way ranging (TWR) technique (e.g., single-sided TWR and/or double-sided TWR). In an embodiment, the positioning technique may include a positioning technique based on radio frequency identification (RFID), infrared light, ultrasound, ZigBee, or a combination thereof, in addition to the UWB based positioning technique.

In an embodiment, the processor 120 may identify that a communication connection with the connection requesting device (e.g., the external electronic device 230) is required when the distance to the connection requesting device is greater than the distance to the nearest of the previously-connected devices. In an embodiment, the processor 120 may identify that a communication connection with the connection requesting device (e.g., the external electronic device 230) is not required when the distance to the connection requesting device is less than the distance to the nearest of the previously-connected devices.

In an embodiment, when it is identified that the communication connection with the connection requesting device (e.g., the external electronic device 230) is required, the processor 120 may disconnect the communication connection with a selected device from among the previously-connected devices. In an embodiment, the selected device may be a device having the highest signal strength among the previously-connected devices. In an embodiment, the selected device may be a device having the smallest signal attenuation among the previously-connected devices. In an embodiment, the selected device may be a device closest to the electronic device 101 among the previously-connected devices.

In an embodiment, the processor 120 may establish a communication connection with the connection requesting device (e.g., the external electronic device 230). In an embodiment, when the communication connection with the selected device is disconnected, the processor 120 may establish a communication connection with the connection requesting device (e.g., the external electronic device 230).

In an embodiment, the processor 120 may periodically receive a signal from the connection requesting device (e.g., the external electronic device 230) when the communication connection with the connection requesting device (e.g., the external electronic device 230) has been established. In an embodiment, the processor 120 may store information (e.g., received signal strength) on signals periodically received from the connection requesting device (e.g., the external electronic device 230) in the memory 130.

In an embodiment, the processor 120 may receive an advertisement packet from a device (e.g., the external electronic device 210) (hereinafter referred to as a 'disconnected device') with which a communication connection has been disconnected. In an embodiment, the processor 120 may perform distance positioning with respect to the disconnected device when the signal strength of the advertisement packet of the disconnected device is less than or equal to a specified strength. In an embodiment, the processor 120 may perform distance positioning with respect to the disconnected device when the signal strength of the advertisement packet of the disconnected device is lower than the signal strength of a previous advertisement packet by the specified strength.

In an embodiment, the processor 120 may identify whether or not to establish a communication connection with the disconnected device based on a result of distance positioning.

In an embodiment, the processor 120 may identify whether or not to establish a communication connection with the external electronic devices 210, 220, and 230 based on the location information of the electronic device 101 and/or a result of distance positioning of the external electronic devices 210, 220, and 230. In an embodiment, the location information of the electronic device 101 may be identified through a sensor module (e.g., the sensor module 176 of FIG. 1) of the electronic device 101.

In an embodiment, the processor 120 may establish a communication connection with an external electronic device that moves away from the electronic device 101 among the external electronic devices 210, 220, and 230 based on the location information of the electronic device 101 and/or the result of distance positioning of the external electronic devices 210, 220, and 230. In an embodiment, when the electronic device 101 moves, the processor 120 may establish a communication connection with an external electronic device that moves away from the electronic device 101 among the external electronic devices 210, 220, and 230.

In an embodiment, the processor 120 may identify whether or not to establish a communication connection with the external electronic devices 210, 220, and 230 based on the situation information of the electronic device 101 (e.g., boarding information of the user of the electronic device 101). In an embodiment, the situation information of the electronic device 101 may be obtained through interaction with other electronic devices (e.g., NFC tag, vehicle ignition on/off through a mobile car key, communication connection with an electronic device mounted in a vehicle).

In an embodiment, before the user of the electronic device 101 gets into the vehicle, the processor 120 may establish a communication connection with an external electronic device existing outside a vehicle among the external electronic devices 210, 220, and 230. In an embodiment, when the distance from the external electronic device with which the communication connection has been established increases after the user of the electronic device 101 gets into the vehicle, the processor 120 may notify the user of loss.

In an embodiment, after the user of the electronic device 101 gets into the vehicle, the processor 120 may establish a communication connection with an external electronic device existing inside the vehicle among the external electronic devices 210, 220, and 230. In an embodiment, when the distance from the external electronic device with which the communication connection has been established increases after the user of the electronic device 101 gets out of the vehicle, the processor 120 may notify the user of loss.

In an embodiment, the processor 120 may provide (e.g., display) information on connection history (e.g., current connection, previous connection, disconnection time) with the external electronic devices 210, 220, and 230 to the user (via the display module 160).

In an embodiment, the processor 120 may use at least one of the number of available connections to perform communication with a device with which the communication connection has been disconnected. In an embodiment, the processor 120 may perform communication with at least one disconnected device using an extra communication resource. In an embodiment, the processor 120 may sequentially establish a communication connection with at least one disconnected device by using the communication resource.

In an embodiment, the at least one disconnected device may be a device selected according to a specified condition (e.g., importance) among the disconnected devices.

Figure 3:
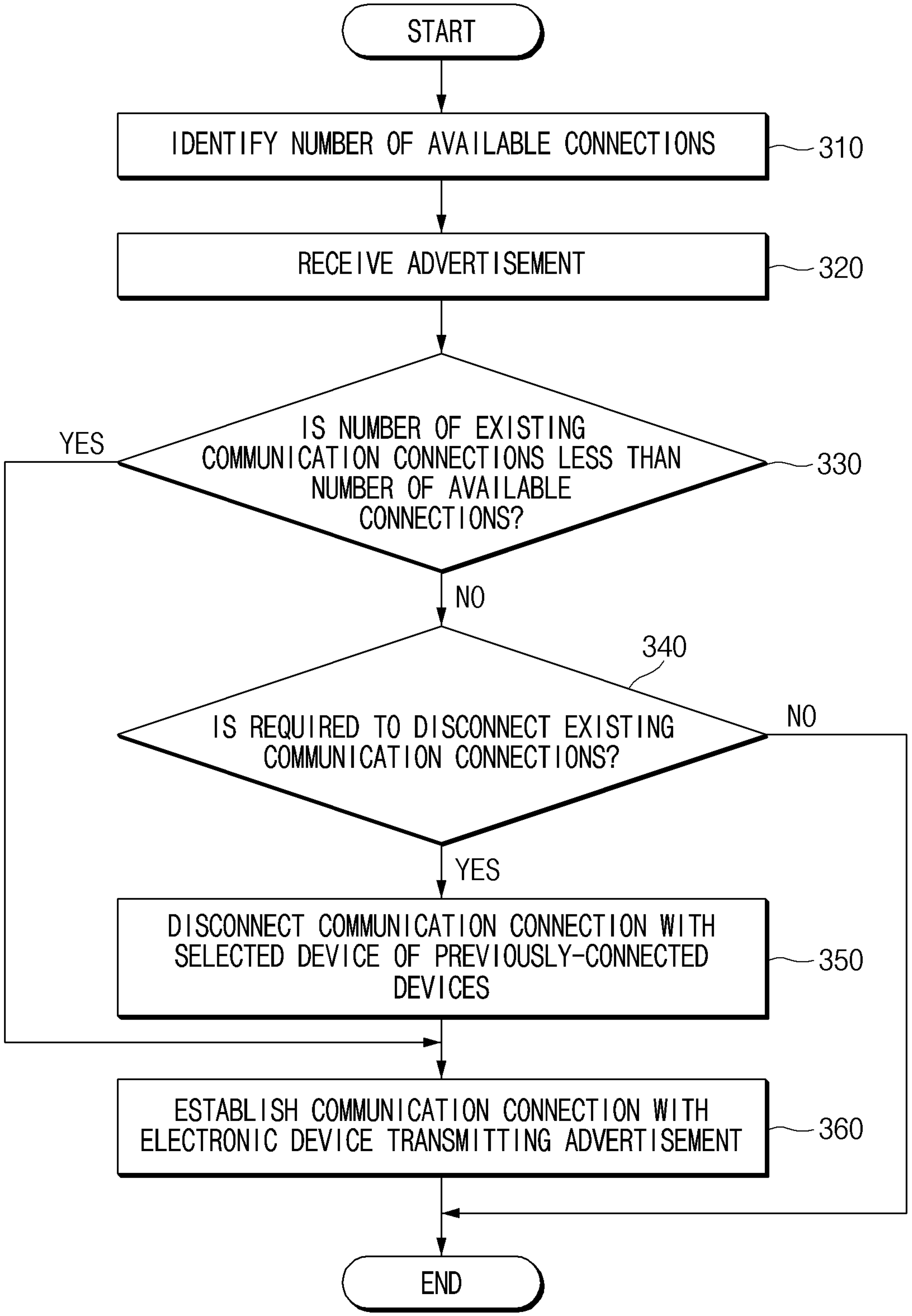
FIG. 3 is a flowchart illustrating an operation of establishing a communication connection in an electronic device according to an embodiment.

FIG. 3 is a flowchart illustrating an operation of establishing a communication connection by the electronic device 101 according to an embodiment.

Referring to FIG. 3, in operation 310, the processor 120 of the electronic device 101 may identify the number of available connections. In an embodiment, the processor 120 may determine the number of available connections as a number greater than or equal to the minimum number of available connections and less than or equal to the maximum number of available connections. In an embodiment, the processor 120 may identify the maximum number of available connections as the number of available connections when initially setting the number of available connections.

In an embodiment, the processor 120 may identify the number of available connections based on available resources. In an embodiment, the resources may include communications, batteries, or combinations thereof.

In operation 320, the processor 120 may receive an advertisement from an electronic device (e.g., the external electronic device 230). In an embodiment, the processor 120 may receive an advertisement according to a first RAT (e.g., BLE).

In operation 330, the processor 120 may identify whether the number of existing communication connections is less than the number of possible communication connections.

In operation 330, when the number of existing communication connections is less than the number of possible communication connections, the processor 120 may perform operation 360. In operation 330, when the number of existing communication connections is not less than the number of possible communication connections, the processor 120 may perform operation 340.

In operation 340, the processor 120 may identify whether disconnection of the existing communication connection is required.

In an embodiment, the processor 120 may identify whether disconnection of an existing communication connection is required based on the signal strength, the degree of signal attenuation, distance of the electronic device (e.g., the external electronic device 230) that has transmitted the advertisement, the number of previously-connected devices (e.g., the external electronic device 210 and the external electronic device 220), the number of available connections, or a combination thereof.

In an embodiment, when the number of previously-connected devices (e.g., the external electronic devices 210 and 220) is equal to (or greater than) the number of available connections, and the signal strength of an electronic device (e.g., the external electronic devices 230) is weaker than the largest signal strength among signal strengths of the previously-connected devices (e.g., the external electronic device 210 and the external electronic device 220), the processor 120 may identify that disconnection of an existing communication connection is required. For example, the fact that any electronic device communicatively connected to the electronic device 101 has the strongest signal strength may mean that there is a low possibility that the user will lose the electronic device. For example, the fact that the electronic device transmitting the advertisement has the weakest signal strength than any other electronic device communicatively connected to the electronic device 101 may mean that there is a high possibility that the user will lose the electronic device transmitting the advertisement.

In an embodiment, when the number of previously-connected devices (e.g., the external electronic devices 210 and 220) is equal to (or greater than) the number of available connections, and the degree of signal attenuation of an electronic device (e.g., the external electronic devices 230) is greater than the lowest degree of signal attenuation among degrees of signal attenuation of the previously-connected devices (e.g., the external electronic device 210 and the external electronic device 220), the processor 120 may identify that disconnection of an existing communication connection is required. For example, the fact that any electronic device communicatively connected to the electronic device 101 has the largest degree of signal attenuation may mean that there is a low possibility that the user will lose the electronic device. For example, the fact that the electronic device transmitting the advertisement has the largest degree of signal attenuation than any other electronic device communicatively connected to the electronic device 101 may mean that there is a high possibility that the user will lose the electronic device transmitting the advertisement.

In an embodiment, the number of previously-connected devices (e.g., the external electronic devices 210 and 220) is equal to (or greater than) the number of available connections, and a distance of the external electronic device 230 is farther than the closest distance to the electronic device 101 among the previously-connected devices (e.g., the external electronic device 210 and the external electronic device 220), the processor 120 may identify that disconnection of an existing communication connection is required. For example, the fact that any electronic device communicatively connected to the electronic device 101 is closest to the electronic device 101 may mean that there is a low possibility that the user will lose the electronic device. For example, the fact that the electronic device transmitting the advertisement has the largest distance from the electronic device 101 than any other electronic device communicatively connected to the electronic device 101 may mean that there is a high possibility that the user will lose the electronic device transmitting the advertisement.

In an embodiment, when the number of previously-connected devices (e.g., the external electronic devices 210 and 220) is equal to (or greater than) the number of available connections, but the signal strength of an electronic device (e.g., the external electronic devices 230) is greater than the largest signal strength among signal strengths of the previously-connected devices (e.g., the external electronic device 210 and the external electronic device 220), the processor 120 may identify that disconnection of an existing communication connection is not required.

In an embodiment, when the number of previously-connected devices (e.g., the external electronic devices 210 and 220) is equal to (or greater than) the number of available connections, but the degree of signal attenuation of an electronic device (e.g., the external electronic devices 230) is lower than the lowest degree of signal attenuation among degrees of signal attenuation of the previously-connected devices (e.g., the external electronic device 210 and the external electronic device 220), the processor 120 may identify that disconnection of an existing communication connection is not required.

In an embodiment, the number of previously-connected devices (e.g., the external electronic devices 210 and 220) is equal to (or greater than) the number of available connections, but a distance of the external electronic device 230 is closer than the closest distance to the electronic device 101 among the previously-connected devices (e.g., the external electronic device 210 and the external electronic device 220), the processor 120 may identify that disconnection of an existing communication connection is not required.

In an embodiment, when the number of previously-connected devices (e.g., the external electronic device 210 and the external electronic device 220) is less than the number of available connections, the processor 120 may identify that disconnection of an existing communication connection is not required.

In operation 340, when it is identified that disconnection of an existing communication connection is required, the processor 120 may perform operation 350. In operation 340, when it is identified that disconnection of an existing communication connection is not required, the processor 120 may end the operation according to FIG. 3.

In operation 350, the processor 120 may disconnect a communication connection with a selected device among the previously-connected devices (e.g., the external electronic device 210 and the external electronic device 220).

In an embodiment, the processor 120 may select one of the previously-connected devices (e.g., the external electronic device 210 and the external electronic device 220) according to a specified criterion and disconnect a communication connection with the selected device.

In an embodiment, the processor 120 may use a device (e.g., the external electronic device 210) having the largest signal strength among previously connected devices (e.g., the external electronic device 210 and the external electronic device 220) and disconnect a communication connection with the selected device.

In an embodiment, the processor 120 may use a device (e.g., the external electronic device 210) having the smallest degree of signal attenuation among previously connected devices (e.g., the external electronic device 210 and the external electronic device 220) and disconnect a communication connection with the selected device.

In an embodiment, the processor 120 may select a device closest to the electronic device 101 (e.g., the external electronic device 210) among the previously-connected devices (e.g., the external electronic device 210 and the external electronic device 220) and disconnect the communication connection with the selected device.

In operation 360, the processor 120 may establish a communication connection with an electronic device (e.g., the external electronic device 230) that has transmitted an advertisement.

Thereafter, the processor 120 may store information (e.g., received signal strength) on a signal periodically received from the electronic device (e.g., the external electronic device 230) in the memory 130.

Figure 4:
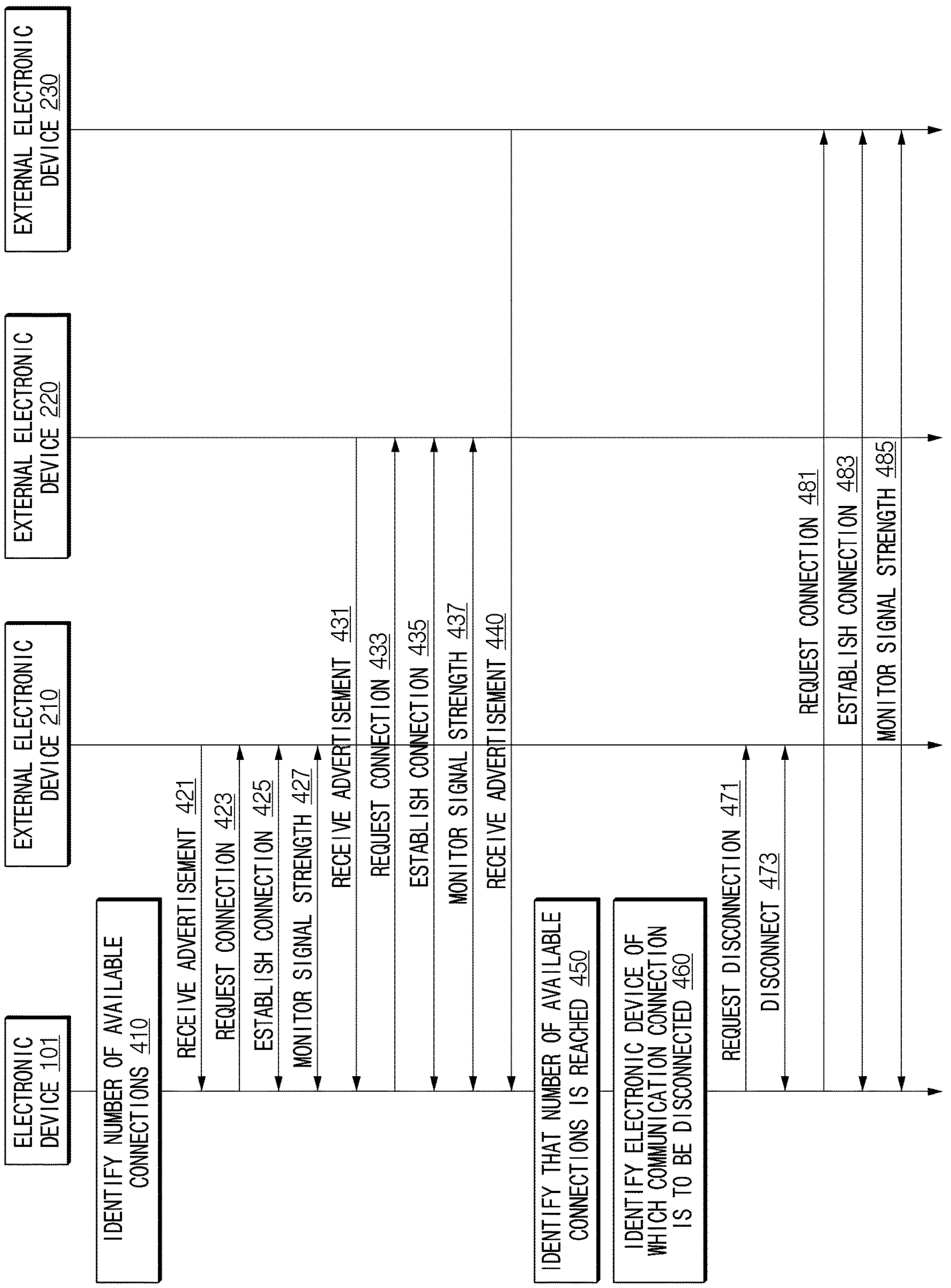
FIG. 4 is a diagram illustrating a scenario of establishing a communication connection between electronic devices according to an embodiment.

FIG. 4 is a diagram illustrating a scenario of establishing a communication connection between electronic devices 101, 210, 220, and 230 according to an embodiment.

Referring to FIG. 4, in operation 410, the electronic device 101 may identify the number of available connections (e.g., 2).

In operation 421, the electronic device 101 may receive an advertisement from the external electronic device 210.

In operation 423, the electronic device 101 may transmit a connection request to the external electronic device 210. In an embodiment, the electronic device 101 may transmit a connection request to the external electronic device 210 because the number of electronic devices currently communicatively connected (e.g., 0) is less than the number of available connections (e.g., 2).

In operation 425, the electronic device 101 and the external electronic device 210 may establish a communication connection.

In operation 427, the electronic device 101 may monitor the signal strength of the external electronic device 210. In an embodiment, the electronic device 101 may monitor the strength of a signal periodically received from the external electronic device 210. In another embodiment, the electronic device 101 may receive information about the strength of a signal, received from the electronic device 101 by the external electronic device 210, from the external electronic device 210.

In operation 431, the electronic device 101 may receive an advertisement from the external electronic device 220.

In operation 433, the electronic device 101 may transmit a connection request to the external electronic device 220. In an embodiment, the electronic device 101 may transmit a connection request to the external electronic device 220 because the number of electronic devices currently communicatively connected (e.g., 1) is less than the number of available connections (e.g., 2).

In operation 435, the electronic device 101 and the external electronic device 220 may establish a communication connection.

In operation 437, the electronic device 101 may monitor the signal strength of the external electronic device 220. In an embodiment, the electronic device 101 may monitor the strength of a signal periodically received from the external electronic device 220. In another embodiment, the electronic device 101 may receive information about the strength of a signal, received from the electronic device 101 by the external electronic device 220, from the external electronic device 220.

In operation 440, the electronic device 101 may receive an advertisement from the electronic device 230. According to an embodiment, the electronic device 101 may perform operation 450 when receiving an advertisement from the electronic device 230.

In operation 450, the electronic device 101 may identify that the number of currently communicatively connected electronic devices (e.g., 2) has reached the number of available connections (e.g., 2). In an embodiment, the electronic device 101 may perform operation 460 when the number (e.g., 2) of electronic devices currently communicatively connected has reached the number of available connections (e.g., 2).

In operation 460, the electronic device 101 may identify an electronic device of which the communication connection is to be disconnected.

In an embodiment, when a communication connection with the external electronic device 230 is required, the electronic device 101 may identify an electronic device of which the communication connection is to be disconnected. In an embodiment, the need for a communication connection with the external electronic device 230 may be identified based on the signal strength, degree of signal attenuation, or distance of each of the external electronic devices 210, 220, and 230.

In an embodiment, the electronic device 101 may identify an electronic device of which the communication connection is to be disconnected based on the signal strength of each of the external electronic devices 210, 220, and 230. In an embodiment, the electronic device 101 may identify an electronic device of which the communication connection is to be disconnected based on the degree of signal attenuation of each of the external electronic devices 210, 220, and 230. In an embodiment, the electronic device 101 may identify an electronic device of which the communication connection is to be disconnected based on the distance of each of the external electronic devices 210, 220, and 230. In the embodiment of FIG. 4, it is assumed that the signal strength of the external electronic device 210 is greater than the signal strengths of the external electronic devices 220 and 230, the degree of signal attenuation of the external electronic device 210 is less than those of the external electronic devices 220 and 230, or a distance between the external electronic device 210 and the electronic device 101 is less than a distance between the external electronic device 220 and the electronic device 101 and a distance between the external electronic device 230 and the electronic device 101.

In operation 471, the electronic device 101 may request disconnection of the communication connection from the selected external electronic device 210.

In operation 473, the electronic device 101 and the external electronic device 210 may disconnect the communication connection therebetween.

In operation 481, the electronic device 101 may request a communication connection from the external electronic device 230. In an embodiment, the electronic device 101 may request a communication connection from the external electronic device 230 based on disconnection of the communication connection with the electronic device 210.

In operation 483, the electronic device 101 and the external electronic device 230 may establish a communication connection.

In operation 485, the electronic device 101 may monitor the signal strength of the external electronic device 230. In an embodiment, the electronic device 101 may monitor the strength of a signal periodically received from the external electronic device 230.

Figure 5:
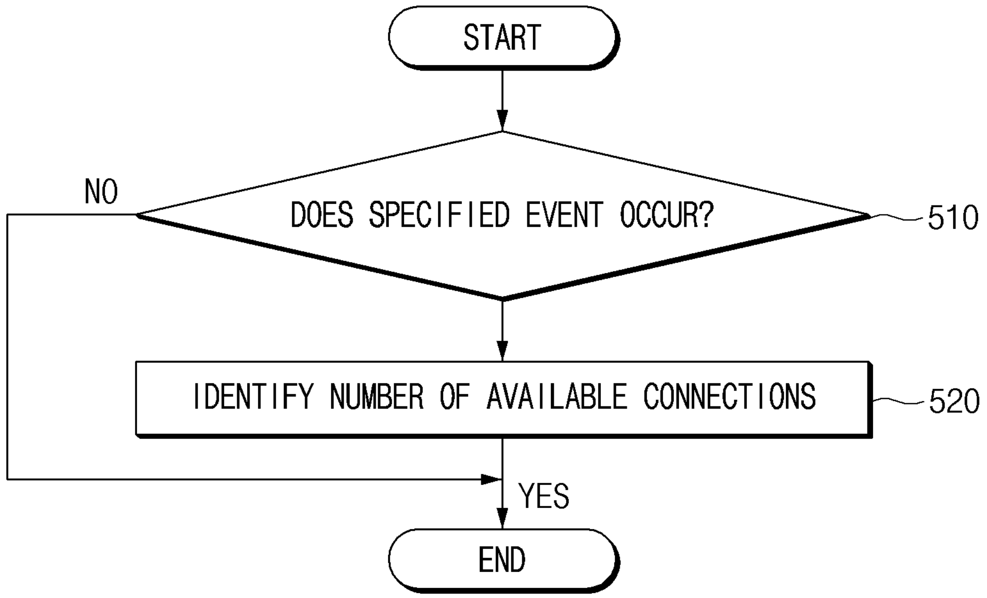
FIG. 5 is a flowchart illustrating an operation of determining the number of connectable electronic devices in an electronic device according to an embodiment.

FIG. 5 is a flowchart illustrating an operation of identifying the number of connectable electronic devices in the electronic device 101 according to an embodiment. In an embodiment, the operations of FIG. 5 may be included in operation 310 of FIG. 3.

Referring to FIG. 5, in operation 510, the processor 120 of the electronic device 101 may determine whether a specified event has occurred.

In an embodiment, the specified event may be a change in the number of communication connections using a frequency band (e.g., 2.4 GHz) related to the first RAT (e.g., BLE). In an embodiment, the specified event may be a change in quality of a communication connection using the frequency band related to the first RAT (e.g., BLE). In an embodiment, the specified event may be a change in the state (e.g., remaining capacity, charging status) of the battery 189 of the electronic device 101. In an embodiment, the specified event may be a change in situation information (time information and/or location information).

In operation 520, the processor 120 may identify the number of available connections.

In an embodiment, the processor 120 may decrease the number of available connections by a specified value based on an increase in the number of communication connections using a specified frequency band. In an embodiment, the processor 120 may increase the number of available connections by a specified value based on a decrease in the number of communication connections using a specified frequency band.

In an embodiment, the processor 120 may decrease the number of available connections by a specified value based on degradation in the quality of a communication connection using a specified frequency band. In an embodiment, the processor 120 may increase the number of available connections by a specified value based on the good quality of a communication connection using a specified frequency band.

In an embodiment, the processor 120 may decrease the number of available connections by a specified value based on the remaining capacity of the battery 189 being equal to or less than a first capacity. In an embodiment, the processor 120 may increase the number of available connections by a specified value based on the remaining capacity of the battery 189 being equal to or greater than a second capacity. In an embodiment, the processor 120 may increase the number of available connections by a specified value based on the battery 189 being charged.

In an embodiment, the processor 120 may increase the number of available connections by a specified value based on the electronic device 101 entering a lost location. In an embodiment, the processor 120 may decrease the number of available connections by a specified value based on the electronic device 101 departing from the lost location.

In an embodiment, the processor 120 may increase the number of available connections by a specified value based on the current time corresponding to a lost time. In an embodiment, the processor 120 may decrease the number of available connections by a specified value based on the current time deviating from the lost time.

Figure 6:
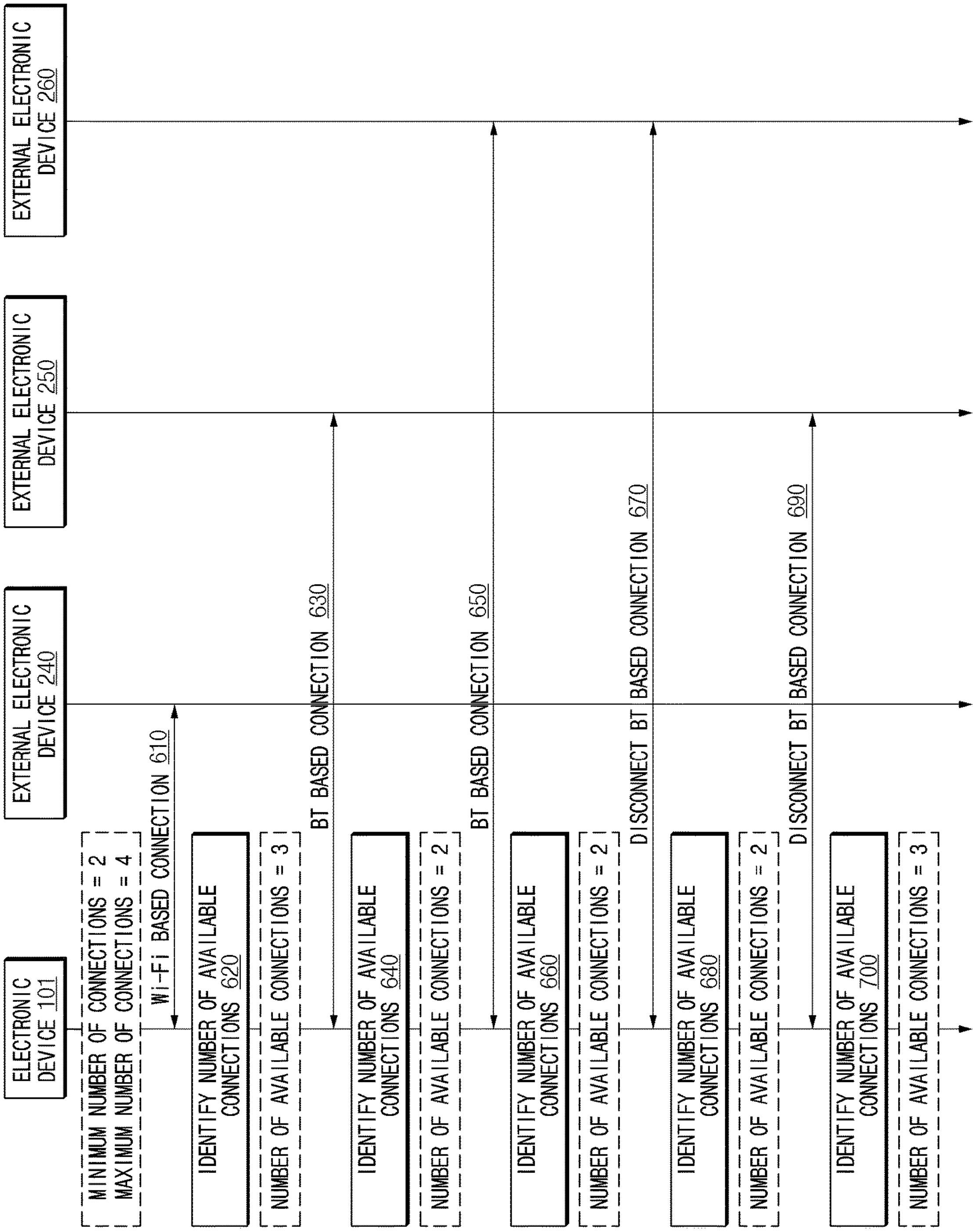
FIG. 6 is a diagram illustrating a scenario in which an electronic device adaptively determines the number of connectable electronic devices according to an embodiment.

FIG. 6 is a diagram illustrating a scenario of adaptively determining the number of connectable electronic devices in an electronic device according to an embodiment.

Referring to FIG. 6, in the electronic device 101, the minimum number of available connections capable of communication connection through the first RAT (e.g., BLE) may be set to 2, and the maximum number of available connections capable of communication connection through the first RAT (e.g., BLE) may be set to 4. In an embodiment, the number of available connections in the electronic device 101 may be equal to the maximum number of available connections. In an embodiment, the number of available connections may be the number of electronic devices capable of communication connection through a first RAT (e.g., BLE). In an embodiment, the number of available connections may be determined as a number greater than or equal to the minimum number of available connections and less than or equal to the maximum number of available connections. In an embodiment, an initial setting value for the number of available connections may correspond to the maximum number of available connections. In an embodiment, the number of available connections, the minimum number of available connections, and the maximum number of available connections may be a number set for a specific type of electronic device (e.g., a device for identification as to whether the device is lost or not) among electronic devices capable of communication connection through the first RAT (e.g., BLE).

In operation 610, the electronic device 101 may establish a Wi-Fi based communication connection with the external electronic device 240. For example, Wi-Fi based communication may be communication using a frequency band of 2.4 GHz.

In operation 620, the electronic device 101 may identify the number of available connections. In an embodiment, the electronic device 101 may decrease the number of available connections by a specified value (e.g. 1) based on an increase in the number of communication connections using a frequency band (e.g., 2.4 GHz) related to the first RAT (e.g., BLE). In an embodiment, because there is a Wi-Fi based communication connection with the external electronic device 240, the electronic device 101 may decrease the number of available connections from 4 to 3.

In an embodiment, as the electronic device 101 newly identifies the number of available connections, the number of available connections may be set to 3.

In an embodiment, when the number of electronic devices communicatively connected to the electronic device 101 according to the first RAT (e.g., BLE) exceeds three, the communication connection with the electronic device selected according to a specified criterion may be disconnected. In an embodiment, when the number of electronic devices communicatively connected to the electronic device 101 according to the first wireless access technology (e.g., BLE) exceeds three, the communication connection with the selected electronic device may be disconnected such that the number of communication connections according to the first wireless access technology (e.g., BLE) is three.

In an embodiment, the specified criterion may be based on the signal strength, the degree of signal attenuation, or the distance of each of external electronic devices (e.g., the external electronic devices 210, 220, and 230) for which a communication connection with the electronic device 101 according to the first RAT (e.g., BLE) are established. In an embodiment, the electronic device 101 may identify an electronic device of which the communication connection is to be disconnected in descending order of signal strengths of the external electronic devices (e.g., the external electronic devices 210, 220, and 230) for which a communication connection according to the first RAT (e.g., BLE) are established. In an embodiment, the electronic device 101 may identify an electronic device of which the communication connection is to be disconnected in ascending order of degrees of signal attenuation of the external electronic devices (e.g., the external electronic devices 210, 220, and 230) for which a communication connection according to the first RAT (e.g., BLE) are established. In an embodiment, the electronic device 101 may identify an electronic device of which the communication connection is to be disconnected in ascending order of distances of the external electronic devices (e.g., the external electronic devices 210, 220, and 230) for which a communication connection according to the first RAT (e.g., BLE) are established.

In operation 630, the electronic device 101 may establish a Bluetooth™ (BT) based communication connection with the external electronic device 250.

In operation 640, the electronic device 101 may identify the number of available connections. In an embodiment, the electronic device 101 may decrease the number of available connections by a specified value (e.g. 1) based on an increase in the number of communication connections using a frequency band related to the first RAT (e.g., BLE). In an embodiment, because there are a Wi-Fi based communication connection with the external electronic device 240 and a BT based communication connection with the external electronic device 250, the electronic device 101 may decrease the number of available connections from 3 to 2.

In an embodiment, as the electronic device 101 newly identifies the number of available connections, the number of available connections may be set to 2.

In an embodiment, when the number of external electronic devices communicatively connected to the electronic device 101 according to the first RAT (e.g., BLE) exceeds two, the communication connection with the external electronic device selected according to a specified criterion may be disconnected.

In operation 650, the electronic device 101 may establish a BT based communication connection with the external electronic device 260.

In operation 660, the electronic device 101 may identify the number of available connections. In an embodiment, the electronic device 101 may maintain the number of available connections because the number of available connections is equal to the minimum number of available connections. In an embodiment, because there are a Wi-Fi based communication connection with the external electronic device 240, a BT based communication connection with the external electronic device 250, and a BT based communication connection with the external electronic device 260 but the number of available connections reaches the minimum number of available connections, the electronic device 101 may maintain the number of available connections at two.

In an embodiment, as the electronic device 101 maintains the number of available connections, the number of available connections may be set to 2.

In operation 670, the electronic device 101 may disconnect the BT based communication connection with the external electronic device 260.

In operation 680, the electronic device 101 may identify the number of available connections.

In an embodiment, the electronic device 101 may maintain the number of available connections based on the number of communication connections using a frequency band related to the first RAT (e.g., BLE). In an embodiment, because there are a Wi-Fi based communication connection with the external electronic device 240 and a BT based communication connection with the external electronic device 250, the electronic device 101 may maintain the number of available connections at two.

In another embodiment, the electronic device 101 may increase the number of available connections by a specified value based on the disconnection of the BT based communication connection with the electronic device 260.

In an embodiment, as the electronic device 101 maintains the number of available connections, the number of available connections may be set to 2.

In operation 690, the electronic device 101 may disconnect the BT based communication connection with the external electronic device 250.

In operation 700, the electronic device 101 may identify the number of available connections.

In an embodiment, the electronic device 101 may increase the number of available connections by one based on the number of communication connections using a frequency band related to the first RAT (e.g., BLE). In an embodiment, because there is a Wi-Fi-based communication connection with the external electronic device 240, the electronic device 101 may increase available connections to 3 by one.

In an embodiment, as the electronic device 101 increases the number of available connections by one, the number of available connections may be set to 3.

Figure 7:
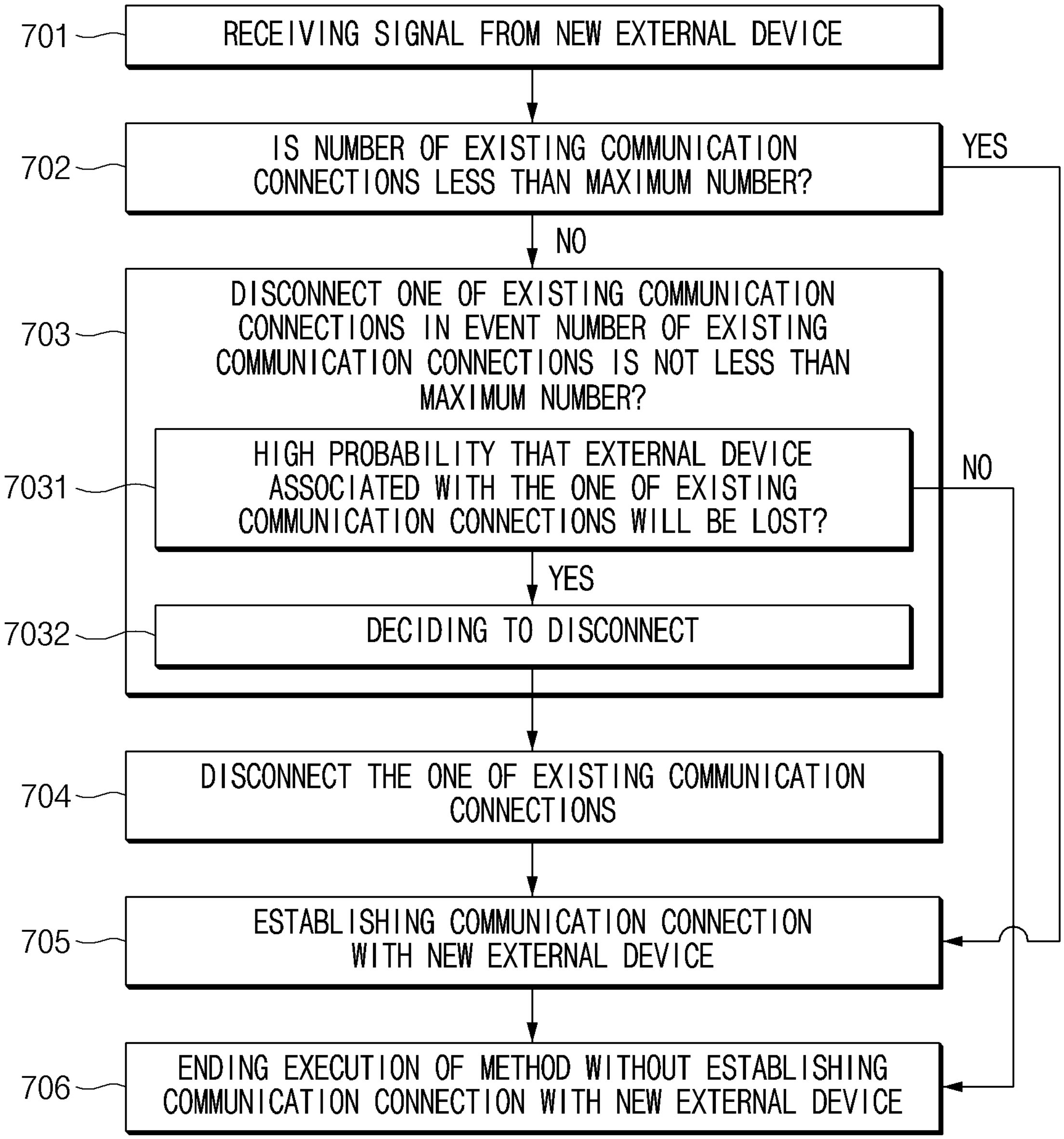
FIG. 7 is a flowchart illustrating an operation of establishing a communication connection in an electronic device according to an embodiment.

With reference to FIG. 7, a method of operating an electronic device including a communication module, such as the electronic device 101 and the communication module 190 described above, is provided. The method includes receiving a signal from a new external device (in operation 701), determining whether a number of existing communication connections between the electronic device and other external devices is less than the maximum number (in operation 702), determining whether to disconnect one of the existing communication connections in an event the number of existing communication connections is not less than the maximum number (in operation 703), disconnecting the one of the existing communication connections in accordance with an affirmative result of the determining of whether to disconnect the one of the existing communication connections (in operation 704) and establishing a communication connection with the new external device (in operation 705).

The method can further include establishing the communication connection with the new external device of operation 705 in an event the number of existing communication connections is determined to be less than the maximum number in the determining of operation 702 and ending an execution of the method without establishing the communication connection with the new external device in accordance with a negative result of the determining of whether to disconnect the one of the existing communication connections of operation 704 (operation 706).

In accordance with an embodiment, the determining of whether to disconnect the one of the existing communication connections of operation 703 includes determining whether there is a high probability that an external device associated with the one of the existing communication connections will be lost (operation 7031) and deciding to disconnect the one of the existing communication connections in accordance with an affirmative result of the determining of operation 7031 (operation 7032) or proceeding to operation 707 in accordance with a negative result of the determining of operation 7031. The high probability that the external device will be lost can be based on at least one or more of a signal strength or quality of the one of the existing communication connections, signal attenuation of the one of the existing communication connections and a distance between the external device and the electronic device.

According to an embodiment of the disclosure, the electronic device 101 includes the communication module 190, the processor 120 operatively connected to the communication module 190, and the memory 130 operatively connected to the processor 120 to store instructions, wherein the instructions, when executed, cause the processor 120 to receive a first signal from a first external electronic device (e.g., the external electronic device 210) through the communication module while a communication connection with at least one second external electronic device (e.g., the external electronic device 220 or 230) is established, select a specified number or less of third external electronic devices (e.g., the external electronic device 210 or 220) among the first external electronic device (e.g., the external electronic device 210) and the at least one second external electronic device (e.g., the external electronic device 220 or 230) based on the first signal, transmit and receive data with the selected third external electronic devices (e.g., the external electronic device 210 or 220) through established communication connections with the selected third external electronic devices (e.g., the external electronic device 210 or 220), and wherein the third external electronic devices (e.g., the external electronic device 210 or 220) are selected from among the first external electronic device (e.g., the external electronic device 210) and the at least one second external electronic device (e.g., the external electronic device 220 or 230) in order of weaker signal strength or greater distance from the electronic device.

In an embodiment, the instructions, when executed, cause the processor 120 to determine the specified number based on available communication resources.

In an embodiment, the instructions, when executed, cause the processor 120 to identify the available communication resources based on a second communication connection through a second RAT using a second frequency band of which at least a portion overlaps a first frequency band of a first RAT used for the communication connection with the second external electronic devices (e.g., the external electronic device 220 or 230).

In an embodiment, the instructions, when executed, cause the processor 120 to identify the available communication resources based on another communication connection through the first RAT.

In an embodiment, the instructions, when executed, cause the processor 120 to disconnect a communication connection with a second external electronic device (e.g., the external electronic device 230) that is not selected as the third external electronic devices (e.g., the external electronic device 210 or 220) from among the at least one second external electronic device (e.g., the external electronic device 220 or 230).

In an embodiment, the instructions, when executed, cause the processor 120 to identify a signal strength of an advertisement signal received from the second external electronic device (e.g., the external electronic device 230) with which the communication connection is disconnected, identify a distance to the second external electronic device (e.g., the external electronic device 230) with which the communication connection is disconnected based on the signal strength of the advertisement signal, and identify whether or not to establish a communication connection with the second external electronic device (e.g., the external electronic device 230) with which the communication connection is disconnected based on the identified distance.

In an embodiment, the instructions, when executed, cause the processor 120 to identify the distance using an ultra wideband (UWB) based positioning technique.

In an embodiment, the instructions, when executed, cause the processor 120 to determine the specified number according to whether a location of the electronic device 101 corresponds to a specified location.

In an embodiment, the instructions, when executed, cause the processor 120 to determine the specified number according to whether a current time corresponds to a specified time.

In an embodiment, the instructions, when executed, cause the processor 120 to determine the specified number based on quality in a second communication connection through a second RAT using a second frequency band of which at least a portion overlaps a first frequency band of a first RAT used for the communication connection with the second external electronic devices (e.g., the external electronic device 220 or 230).

According to an embodiment of the disclosure, a method for operating the electronic device 101 includes receiving a first signal from a first external electronic device (e.g., the external electronic device 210) through the communication module 190 of the electronic device 101 while a communication connection with at least one second external electronic device (e.g., the external electronic device 220 or 230) is established, selecting a specified number or less of third external electronic devices (e.g., the external electronic device 210 or 220) among the first external electronic device (e.g., the external electronic device 210) and the at least one second external electronic device (e.g., the external electronic device 220 or 230) based on the first signal, and transmitting and receiving data with the selected third external electronic devices (e.g., the external electronic device 210 or 220) through established communication connections with the selected third external electronic devices (e.g., the external electronic device 210 or 220), wherein the third external electronic devices (e.g., the external electronic device 210 or 220) are selected from among the first external electronic device (e.g., the external electronic device 210) and the at least one second external electronic device (e.g., the external electronic device 220 or 230) in order of weaker signal strength or greater distance from the electronic device.

In an embodiment, the method may include determining the specified number based on available communication resources.

In an embodiment, the method may include identifying the available communication resources based on a second communication connection through a second RAT using a second frequency band of which at least a portion overlaps a first frequency band of a first RAT used for the communication connection with the second external electronic devices (e.g., the external electronic device 220 or 230).

In an embodiment, the method may include identifying the available communication resources based on another communication connection through the first RAT.

In an embodiment, the method may include disconnecting a communication connection with a second external electronic device (e.g., the external electronic device 230) that is not selected as the third external electronic devices (e.g., the external electronic device 210 or 220) from among the at least one second external electronic device (e.g., the external electronic device 220 or 230).

In an embodiment, the method may include identifying a signal strength of an advertisement signal received from the second external electronic device (e.g., the external electronic device 230) with which the communication connection is disconnected, identifying a distance to the second external electronic device (e.g., the external electronic device 230) with which the communication connection is disconnected based on the signal strength of the advertisement signal, and identifying whether or not to establish a communication connection with the second external electronic device (e.g., the external electronic device 230) with which the communication connection is disconnected based on the identified distance.

In an embodiment, the distance is identified using an ultra wideband (UWB) based positioning technique.

In an embodiment, the method may include determining the specified number according to whether a location of the electronic device 101 corresponds to a specified location.

In an embodiment, the method may include determining the specified number according to whether a current time corresponds to a specified time.

In an embodiment, the method may include determining the specified number based on quality in a second communication connection through a second RAT using a second frequency band of which at least a portion overlaps a first frequency band of a first RAT used for the communication connection with the second external electronic devices (e.g., the external electronic device 230).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:

a communication module;

a processor operatively connected to the communication module; and a memory operatively connected to the processor to store instructions, wherein the instructions, when executed, cause the processor to:

receive a first signal from a first external electronic device through the communication module while a communication connection with at least one second external electronic device is established;

select a specified number or less of third external electronic devices from among the first external electronic device and the at least one second external electronic device based on the first signal; and transmit and receive data with the selected third external electronic devices through established communication connections with the selected third external electronic devices, wherein the third external electronic devices are selected in order of weaker signal strength or greater distance from the electronic device.

2. The electronic device of claim 1, wherein the instructions, when executed, cause the processor to determine the specified number based on available communication resources and to identify the available communication resources based on a second communication connection through a second radio access technology (RAT) using a second frequency band of which at least a portion overlaps a first frequency band of a first radio access technology (RAT) used for the communication connection with the at least one second external electronic device.

3. The electronic device of claim 1, wherein the instructions, when executed, cause the processor to determine the specified number based on available communication resources and to identify the available communication resources based on another communication connection through a first radio access technology (RAT).

4. The electronic device of claim 1, wherein the instructions, when executed, cause the processor to disconnect a communication connection with one of the at least one second external electronic device that is not selected as the third external electronic devices and further cause the processor to:

identify a signal strength of an advertisement signal received from the one of the at least one second external electronic device;

identify a distance to the one of the at least one second external electronic device based on the signal strength of the advertisement signal; and determine whether to establish a communication connection with the one of the at least one second external electronic device based on the identified distance.

5. The electronic device of claim 1, wherein the instructions, when executed, cause the processor to identify the distance using an ultra-wideband (UWB) based positioning technique.

6. The electronic device of claim 1, wherein the instructions, when executed, cause the processor to determine the specified number according to whether a location of the electronic device corresponds to a specified location.

7. The electronic device of claim 1, wherein the instructions, when executed, cause the processor to determine the specified number according to whether a current time corresponds to a specified time.

8. The electronic device of claim 1, wherein the instructions, when executed, cause the processor to determine the specified number based on a quality of a second communication connection through a second radio access technology (RAT) using a second frequency band of which at least a portion overlaps a first frequency band of a first RAT used for the communication connection with the at least one second external electronic device.

9. A method for operating an electronic device comprising:

receiving a first signal from a first external electronic device through a communication module while a communication connection with at least one second external electronic device is established;

selecting a specified number or less of third external electronic devices from among the first external electronic device and the at least one second external electronic device based on the first signal; and transmitting and receiving data with the selected third external electronic devices through established communication connections with the selected third external electronic devices, wherein the third external electronic devices are selected in order of weaker signal strength or greater distance from the electronic device.

10. The method of claim 9, further comprising:

determining the specified number based on available communication resources, wherein the determining of the specified number includes identifying the available communication resources based on a second communication connection through a second radio access technology (RAT) using a second frequency band of which at least a portion overlaps a first frequency band of a first RAT used for the communication connection with the at least one second external electronic device.

11. The method of claim 9, further comprising:

determining the specified number based on available communication resources, wherein the determining of the specified number includes identifying the available communication resources based on another communication connection through a first radio access technology (RAT).

12. The method of claim 9, further comprising:

disconnecting a communication connection with one of the at least one second external electronic device that is not selected as the third external electronic devices;

identifying a signal strength of an advertisement signal received from the one of the at least one second external electronic device;

identifying a distance to the one of the at least one second external electronic device based on the signal strength of the advertisement signal; and determining whether to establish a communication connection with the one of the at least one second external electronic device based on the identified distance.

13. The method of claim 9, wherein the distance is identified using an ultra-wideband (UWB) based positioning technique.

14. The method of claim 9, further comprising:

determining the specified number according to whether a location of the electronic device corresponds to a specified location.

15. The method of claim 9, further comprising:

determining the specified number according to whether a current time corresponds to a specified time.

16. The method of claim 9, further comprising:

determining the specified number based on a quality of a second communication connection through a second radio access technology (RAT) using a second frequency band of which at least a portion overlaps a first frequency band of a first RAT used for the communication connection with the at least one second external electronic device.

* * * * *